Figure 1:
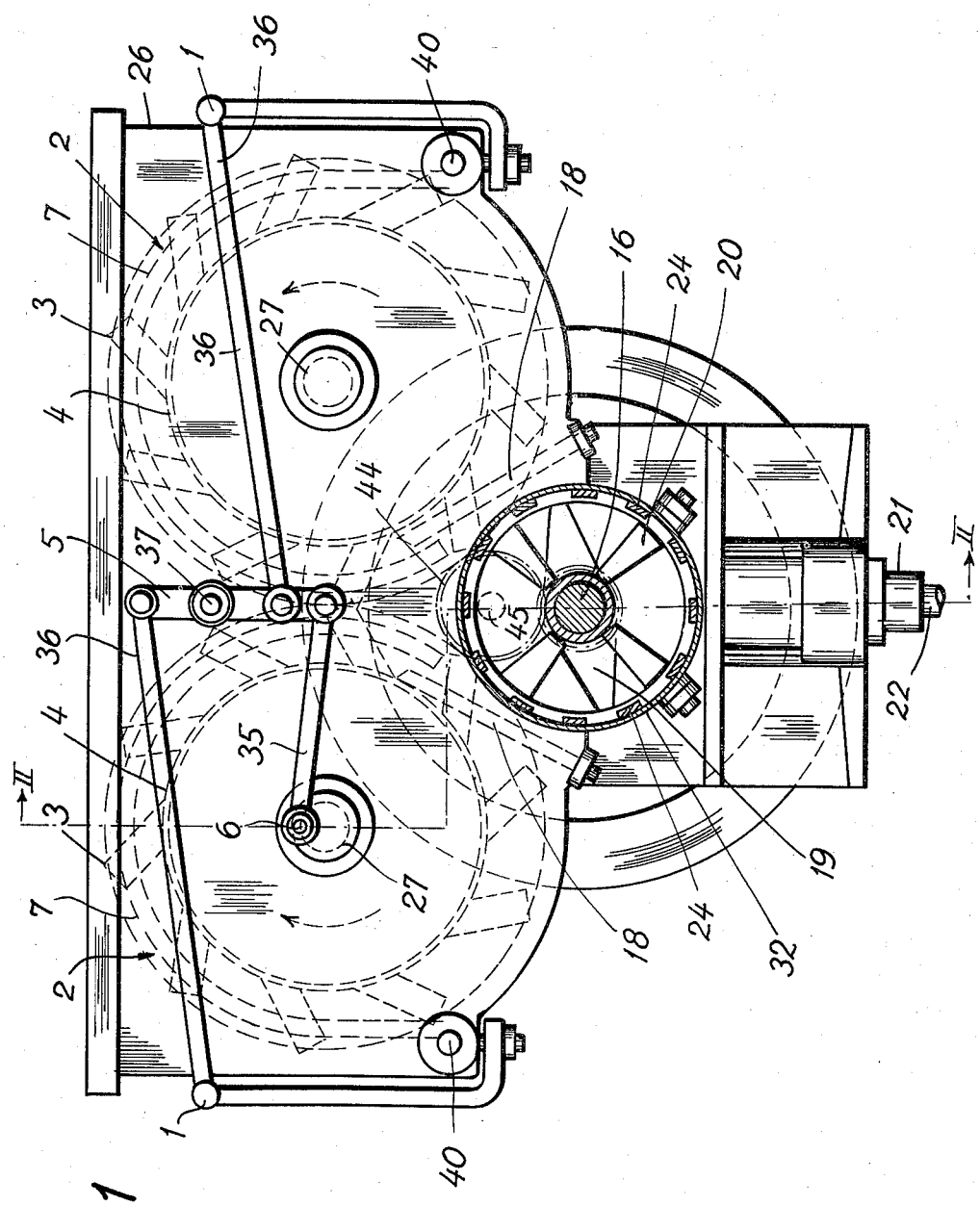

July 5, 1960 C. ØLLGAARD JENSEN 2,943,802
MACHINE FOR THE CHOPPING OF STABLE MANURE
Filed July 29, 1957 2 Sheets-Sheet 2

INVENTOR.
Christian Ollgard Jensen
BY
Atty

United States Patent Office 2,943,802
Patented July 5, 1960

2,943,802
MACHINE FOR THE CHOPPING OF STABLE MANURE

Christian Øllgaard Jensen, Solvang 31 Bredgade, Lem Station, Denmark

Filed July 29, 1957, Ser. No. 674,760

1 Claim. (Cl. 241—186)

This invention relates to new and useful improvements in a machine for the chopping of stable manure.

A machine of the type hitherto known comprises a funnel adapted to be lowered into the stable floor with its upper edge level with the latter and provided at the bottom with a rotating chopping member. The funnel, which is normally closed by a cover, is opened and filled with a portion of stable manure and bedding after each clearing away of the dung from the stable. A chopping member has been started in advance and operates to chop said mixture. At the same time liquid manure is led to the funnel. The resultant mixture will be so thin that during the continuous chopping it will run out through a side hole in the funnel and down into a manure container.

In a machine of this type there is, however, the essential drawback that the chopping takes place under very bad conditions because the admixed liquid manure will dilute the mixture so that the chopping knives have difficulty in cutting the single straws flowing in the mixture. Furthermore said straws may easily escape the chopping member arranged at the bottom of the funnel so that they may be taken directly out through the side hole in the funnel without first sinking to the bottom of the latter, and in this manner they may clog this hole. The result will be that the mixture conducted to the manure container is not so finely cut that it may be pumped up from the manure container. However, the principle of the idea is that it shall be possible to pump the manure mixture up from the container and transport it out on the field by means of an ordinary distributor for liquid manure, or a like machine. This is not feasible. A special machine must be constructed for this distribution because the manure mixture is thick and heterogeneous and apt to precipitate. The mixture will not of its own accord, not even with a relatively fair certainty, distribute itself over 3 to 7 distributing tubes. If only one distributing tube is clogged, a stripe will appear in the crops on the fields. It is however impossible to see or feel that a tube has been clogged as the tube extends down near the earth.

Furthermore, there will be the drawback that the mixture in the manure container is apt to precipitate the heavier constituents so that in reality it is only the liquid manure that is pumped up while the heavier constituents must be taken up manually and distributed separately.

In each clearing away from the stables there will be a certain amount of manure and liquid manure, viz. about two parts of manure and one part of liquid manure. It will be difficult and also impracticable to feed this to the machine in an even flow. The liquid manure must also be added manually which is difficult compared to the current system where the liquid manure runs away of its own accord. The chopping knives must be ground quite often and must be very sharp in order to be able to cut the litter even at a great speed of rotation, and the machine will not be able to deal with a sufficiently great amount of manure during the short time the process lasts.

The clearing away from the stables must not take longer time than before, i.e. a quarter of an hour or twenty minutes in a stable with about 50 head of cattle. The chopped manure will accumulate under the machine and fairly quickly stop the normal working of the plant. The machine must also be rinsed with water, whenever it is going to be used, which is a drawback, as the water will run down into the manure tank and will cause the manure to become heterogeneous and of poor quality. For the same reason the manure tank must be greater than otherwise.

Thus the object of this invention is to provide a machine of the type referred to, which is constructed to chop the stable manure infallibly and to mix the chopped stable manure intimately with the liquid manure so that a finely divided mixture is obtained which may be pumped out without difficulty, and in such a manner that circulation is created in the manure container through the working of the machine.

The characteristic feature of this machine according to the invention is that it is provided with a feeding container comprising one or several drums rotatably mounted at the bottom of the same and driven by a motor, the said drums being provided with feeding barbs displaced relative to one another and arranged to pierce through the grate bars of a grate mounted above the individual drums, under the drums is arranged a feeding channel open in the direction of the feeding container and consisting of a worm conveyor adapted to carry the manure away from the drums and up to rotating chopping members mounted on the same shaft as the worm conveyor, which chopping members cooperate with corresponding rigidly mounted chopping members mounted on the inner side of the wall of the here closed feeding channel.

By this construction is secured above all an even supply of the stable manure to the chopping members which is a presupposition for their correct function. By means of the feeding barbs the drums will carry the manure in an even flow down into the feeding channel. The grates serve to secure that the machine does not take too much when a great amount of stable manure is shoveled down into the feeding container. The straws are prevented from hanging on the grates on account of the feeding barbs piercing through the grate bars.

Moreover, the stable manure will be chopped in the machine without the straws being able to evade the chopping members, and the chopping will be done much better than in the case mentioned hereinbefore because the stable manure is not thinned by liquid manure when passing the chopping members. After having passed the chopping members the chopped stable manure will fall directly down into the manure container, and so there will be no possibility of clogging. During the fall the chopped stable manure will be hit by the jet stream from the pump in which manner it will be mixed intimately with the liquid manure from the manure container and furthermore be distributed evenly over the entire container thus forming in the same a soft gruel which can be pumped by the machine directly into a transportable container and wheeled out to the field. Moreover the jet stream from the pump brings about a circulation in the manure container contributing to the mixing of the liquid manure with the chopped stable manure and moreover causing a washing up of the residue, if any, in the container.

In order to secure that the manure slides off the feeding barbs in the bottom of the feeding container and is not taken up again, the machine may, according to the invention, at the bottom of the feeding container be provided with rigidly mounted stopping barbs extending in between the feeding barbs and abutting closely the periphery of the drum. These stopping barbs will retain the manure and conduct the same down into the feeding channel where it is caught by the worm conveyor.

In order further to secure that the grates are not clogged by the manure shoveled onto them at least one of the drum shafts may, according to the invention, be provided with a crank or eccentric to which is arranged through the medium of a system of connecting rods and link rods to impart to each of the grates an upwards and downwards directed movement. The rotation takes place about 300 times per minute and care has been assured that the machine does not take too much when a wheel cart of stable manure mixed with straw and bedding etc. is tilted down over the grates of the machine. The machine will easily get time to chop a wheel cart's contents in the course of time it takes to fetch a new supply. Moreover the grate movement may be adjusted to take a little or much manure dependent on the efficiency of the motor.

In a preferred manner of construction according to this invention the rotating chopping members consist of two or several back ground and hardened barbs mounted at right angles to the worm conveyor shaft driven directly by the motor, of which barbs the first is mounted 90° after the worm and the others follow after the preceding barb with 90° angular distance.

The rigidly mounted chopping members consist of barbs arranged on either side of the first mentioned barbs and are likewise ground, shaped and hardened. The cutting surface points directly in towards the axis of the shaft of the worm conveyor and operates near to the same. There is twice the number of rigidly mounted barbs as there are rotating barbs. The two kinds of cooperating barbs work near each other, however, without touching each other. The chopping member thus forms a rotating cutter having two cutting surfaces for each rotating barb. Provided there are four rotating barbs there would be eight rigidly mounted barbs which means sixteen cutting surfaces in each direction of rotation. The rigidly mounted barbs are likewise arranged according to a special system alternating the round in the channel wall, however, in such a manner that there are always two barbs which from individual sides engage in between the same rotating barbs. The two foremost barbs operate in between the end of the worm and the first rotating barb. The cooperation between the rotating and the rigidly mounted barbs is to the effect that a rotating barb only operates with one cutting surface in one side. When it gets around to the other side, the cutting surface of the other side will function. The manure is thus turned and thrown about and receives cuts in all directions. In practice it has been proved that the chopping system cannot be clogged and can keep for years without grinding and repairs. It should be added that the drums are likewise driven from the shaft of the worm conveyor by means of a gearing but that the drums rotate considerably slower than the shaft of the worm conveyor and the shaft of the pump.

Figure 2:
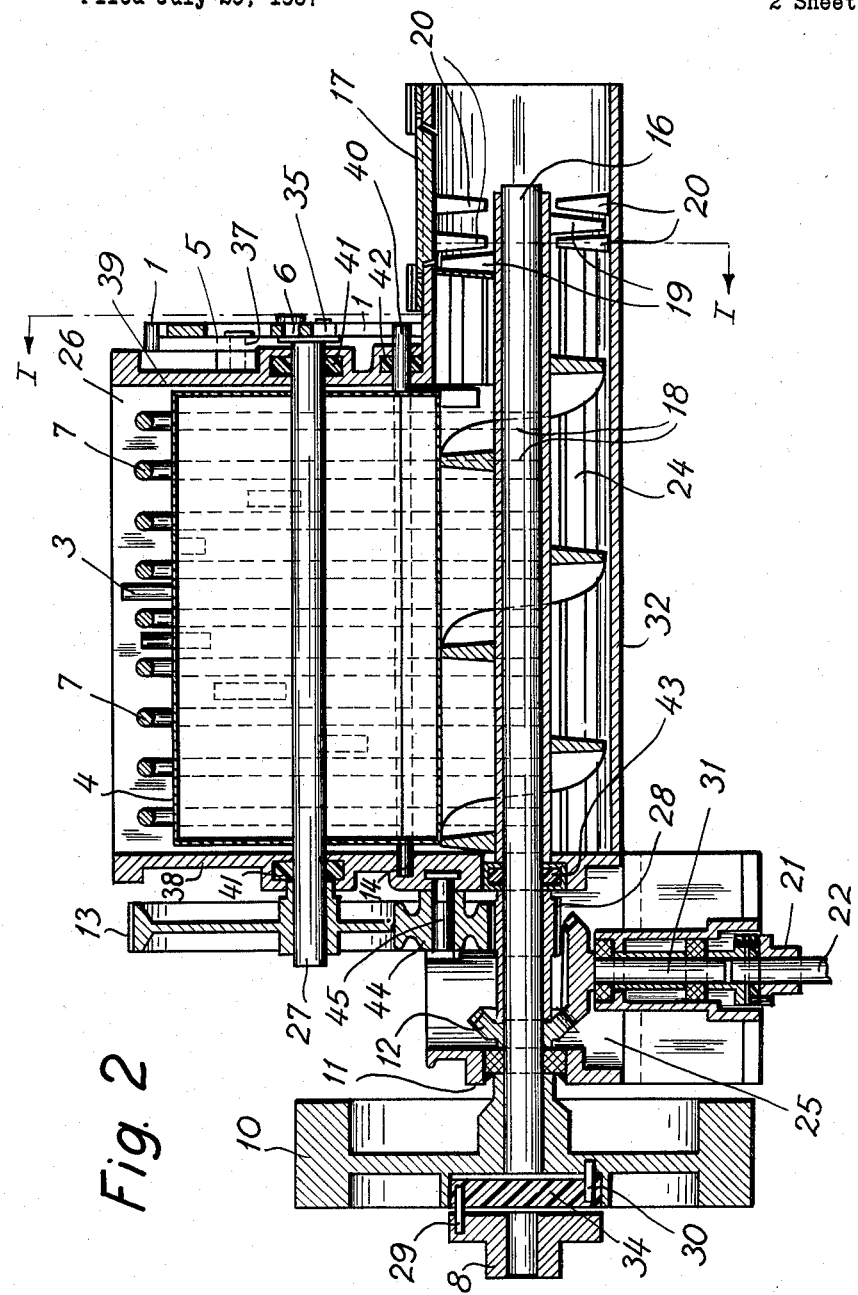

In the drawing is shown a manner of construction of the machine according to the invention, in which Figure 1 shows a cross section through the machine along the lines I—I in Figure 2, and Figure 2 a corresponding longitudinal section through the machine taken on the line II—II in Figure 1, on a somewhat larger scale.

The machine has a feeding container 26, at the bottom of which two drums 4 are mounted on individual shafts 27. Along the periphery the drums are provided with relatively displaced feeding barbs 3 piercing through the bars of a grate 2 arranged above each of the drums and comprising a number of circularly bent grate bars 7, see Figure 2. The grate bars 7 are at the bottom at either side connected by means of a cross bar 14 which is movable and the ends of which are mounted in holes in the end walls 38 and 39 of the container 26, one end of the rods 40 extending out through the end wall 39; tightening rings 31, 42 and 43 are respectively arranged around the shafts 27, the rods 14 and the shaft 16 so that the grates as a whole are movable upwards and downwards. The manure filled into the feeding container 26 is caught by the feeding barbs 3 and taken down to the bottom of the feeding container, where the feeding barbs 3 pierce through a number of stopping barbs 18 rigidly mounted in the bottom of the feeding container in which manner the manure is removed from the feeding barbs 3 and conducted down into a channel 32 in which a worm conveyor is rotatably mounted. On the inner side of the wall surrounding the channel 32 there are longitudinally extending ribs 24 adapted to prevent the mass from rotating together with the worm conveyor 15.

At the end of the worm conveyor 15 and on the same shaft as the latter there is mounted a rotating barb 19 abutting the end of the worm conveyor 15. The other rotating barbs 19 are arranged further out on the same shaft 16 and are displaced relative to the first mentioned barb 19. These barbs 19 cooperate with rigidly mounted barbs 20 which, as shown in Figure 1, point directly towards the longitudinal axis of the shaft. There are two or several sets of rigidly mounted barbs 20 in front of and behind the rearmost of the barbs 19, respectively. These barbs represent the chopping members proper since the drums 4 with the feeding barbs 3 and the worm conveyor 15 only serve to secure an even supply of manure to the chopping members.

The cogged wheels 13 mesh with a cogged wheel 44, which is rotatably mounted on a shaft 45 fastened in the end wall 38. The cogged wheel 44 meshes with a cogged wheel 28 secured on the shaft 16. One of the toothed wheels 13 further engages a toothed wheel 28 on the shaft of the worm.

Furthermore there is created in the container proper 26 a strong circulation which further makes the mixing of the chopped stable manure with the liquid manure easier.

The machine is driven from a motor (not shown) the shaft of which is rigidly connected to a coupling flange 8 having three axially extending smooth pins 29 engaging into corresponding holes in a thick coupling disc 34 made from yielding material. The coupling disc 34 has three other holes receiving three pins 30 extending axially out from a fly wheel 10 which is rigidly mounted on a main shaft 16 on which also the worm conveyor 15 and the barbs 19 are rigidly mounted. The shaft 16 is by means of a gearing 12 in driving connection with an intermediate shaft 31 which by means of a coupling 21 corresponding to the coupling 8, 29, 30, 34, 10 is connected to a shaft 22 leading to the pump. The upper end of the shaft 22 is, however, in the case guided in a centrally positioned hole in the coupling flange on the intermediate shaft 31.

On one of the drum shafts 27 is arranged a crank pin or eccentric 6 which by a connecting rod 35 is connected to a balancing arm 5. Said arm 5 is rotatably mounted on a shaft 37. At an equal distance from the axis 37 of the said balancing arm 5, connecting rods 36 are secured to the balancing arm, said connecting rods being by means of angle bars, attached to transverse shafts 40 to which the two grates 2 are fastened. By rotation of the drum shafts 27 there will in this manner be imparted to the grates 2 an upwards and downwards oscillating movement which will prevent the manure from clogging the grates, and at the same time the grates will be caused to open and close in order thereby to prevent the machine from taking in too much at a time.

At the end of the channel 32 there is in the upper side of the same a cleaning door 17.

What I claim as new, and desire to secure by Letters Patent of the United States is:

In a machine designed for the chopping of stable manure, a feeding container arranged underneath said machine, a rotating conveyor worm in said container adapted to convey the stable manure to a rotating chopping member, rigid chopping members cooperating with the latter, two drums provided with off-set feeding barbs and being mounted in the feeding container above the conveyor worm, feeding barbs of a grate arranged above each of the drums, said off-set feeding barbs being adapted during rotation of the drums to beat between the barbs of said grate, said drums being rotatable in opposite directions of rotation, whereby the sides of the drums lying nearest each other will move downwards towards the conveyor worm, the ends of the grate lying at the greatest distance from each other being rotatably mounted on the shafts, said shafts being through intermediary connecting rods and linked rod actuated by an eccentric arranged on one of the drum shafts, whereby said grates are alternately lifted and lowered simultaneously.

References Cited in the file of this patent

UNITED STATES PATENTS

| | | |
|---|---|---|
| 179,100 | Cormack | June 27, 1876 |
| 648,480 | Ballbach | May 1, 1900 |
| 742,227 | Peck | Oct. 27, 1903 |
| 1,309,525 | Junker | July 8, 1919 |

FOREIGN PATENTS

| | | |
|---|---|---|
| 191,786 | Switzerland | July 15, 1937 |
| 366,055 | Germany | Dec. 27, 1922 |